(12) United States Patent
Lefebre et al.

(10) Patent No.: US 10,110,391 B2
(45) Date of Patent: Oct. 23, 2018

(54) SYSTEMS AND METHODS FOR ESTABLISHING AND USING MULTIMEDIA BROADCAST MULTICAST SERVICES TRANSPORT BEARERS

(71) Applicant: HARRIS CORPORATION, Melbourne, FL (US)

(72) Inventors: Shawn D. Lefebre, Salem, NH (US); Thomas A. Hengeveld, Hollis, NH (US); Peter Monnes, Chelmsford, MA (US)

(73) Assignee: Harris Corporation, Melbourne, FL (US)

( * ) Notice: Subject to any disclaimer, the term of this patent is extended or adjusted under 35 U.S.C. 154(b) by 67 days.

(21) Appl. No.: 15/226,266

(22) Filed: Aug. 2, 2016

(65) Prior Publication Data
US 2018/0041353 A1    Feb. 8, 2018

(51) Int. Cl.
*H04W 72/04* (2009.01)
*H04L 12/18* (2006.01)
*H04W 4/10* (2009.01)
*H04W 72/00* (2009.01)
*H04W 76/40* (2018.01)
*H04W 76/50* (2018.01)
*H04W 76/45* (2018.01)

(52) U.S. Cl.
CPC ........ *H04L 12/1881* (2013.01); *H04L 12/185* (2013.01); *H04L 12/1845* (2013.01); *H04W 4/10* (2013.01); *H04W 72/005* (2013.01); *H04W 72/048* (2013.01); *H04W 76/40* (2018.02); *H04W 76/45* (2018.02); *H04W 76/50* (2018.02)

(58) Field of Classification Search
CPC ........ H04W 72/005; H04W 4/06; H04W 4/10
See application file for complete search history.

(56) References Cited

U.S. PATENT DOCUMENTS

| 9,042,223 | B2 | 5/2015 | Korus et al. |
| 2010/0197265 | A1 | 8/2010 | Dorenbosch et al. |
| 2013/0223222 | A1 | 8/2013 | Kotecha et al. |

(Continued)

FOREIGN PATENT DOCUMENTS

| WO | 2013/101834 A1 | 7/2013 |
| WO | 2015/068983 A1 | 5/2015 |

*Primary Examiner* — Lakeram Jangbahadur
(74) *Attorney, Agent, or Firm* — Fox Rothschild LLP; Robert J. Sacco; Carol E. Thorstad-Forsyth

(57) ABSTRACT

Systems (100) and methods (200) for using Multimedia Broadcast Multicast Services ("MBMS") transport bearers in a network. The methods comprise: performing first operations by a computing device (102) to setup an MBMS transport bearer over which media (e.g., voice) is able to be communicated to a plurality of clients (110-136) via multicast transmissions; and performing second operations by the computing device to inform the plurality of clients of the MBMS transport bearer's establishment. The second operations include, but are not limited to: determining an immediate need of each client of the plurality of clients based on weighted attributes (e.g., priority group affiliating, and/or group status); assembling a prioritization list of clients based on the determined immediate needs of each client; and delivering unicast messages to the clients in accordance with an order specified by the prioritization list.

29 Claims, 5 Drawing Sheets

(56) References Cited

U.S. PATENT DOCUMENTS

| | | | | |
|---|---|---|---|---|
| 2014/0177436 A1* | 6/2014 | Korus | ................ | H04W 76/002 |
| | | | | 370/230 |
| 2014/0177437 A1* | 6/2014 | Korus | .................. | H04W 76/00 |
| | | | | 370/230 |
| 2014/0307610 A1 | 10/2014 | Rudrapatna et al. | | |
| 2015/0131510 A1* | 5/2015 | Gilbert | ................ | H04W 72/005 |
| | | | | 370/312 |

* cited by examiner

SYSTEMS AND METHODS FOR ESTABLISHING AND USING MULTIMEDIA BROADCAST MULTICAST SERVICES TRANSPORT BEARERS

BACKGROUND OF THE INVENTION

Statement of the Technical Field

The present disclosure relates to communication systems. More particularly, the present disclosure relates to systems and methods for dynamically assigning and modifying Multimedia Broadcast Multicast Services ("MBMS") transport bearers, MBMS bearer service areas, and/or MBMS bearer footprints.

Description of the Related Art

MBMS are point-to-multipoint interface specifications for wireless technologies such as $3^{rd}$ Generation Partnership Project Long-Term Evolution ("3GPP LTE"), Wideband Code Division Multiple Access ("WCDMA"), Universal Mobile Telecommunication System ("WMTS"), Enhanced Voice-Data Optimized ("EVDO")/High Rate Packet Data ("HRPD"), and Digital Video Broadcast ("DVB"). MBMS is an add-on to cellular network technologies (e.g., GSM/EDGE and UMTS). MBMS supports both broadcast and multicast transmission modes. The MBMS broadcast mode is used to deliver Internet Protocol ("IP") packets to terminals in a certain area. This is achieved via MBMS transport bearers which are setup for all cells in which the service should be available and continuously transmit as long as the service is running. Each MBMS transport bearer can be a Point-to-Multipoint ("PtM") bearer that can be simultaneously received by multiple terminals.

In MBMS, MBMS Service Areas ("MSAs") can be defined as a collection of cells. Different services (e.g., streaming services and download services) can be delivered in each MSA. Hence public safety services benefit from MBMS utilization. For example, MBMS could be used for emergency alerts in certain areas (e.g., in the case of a hurricane).

The new functionalities which MBMS provides to operators and service providers are grouped in a new functional node called the Broadcast/Multicast Service Center ("BMSC"). The BMSC (1) provides a functional interface between content delivery services and the MBMS service offered by a cellular network, and (2) controls the set-up and release of MBMS transport bearers and the scheduling of MBMS transmissions.

SUMMARY OF THE INVENTION

The present disclosure concerns systems and methods for using MBMS transport bearers in a network. The methods comprise: performing first operations by a computing device (e.g., a mission critical push-to-talk server) to setup an MBMS transport bearer over which media (e.g., voice data) is able to be communicated to a plurality of clients via multicast transmissions (e.g., when the computing device determines that a threshold number of clients are located in a given geographic area); and performing second operations by the computing device to inform the plurality of clients of the MBMS transport bearer's establishment.

The second operations include: building a list of clients to receive information indicating that the MBMS transport bearer has been setup; determining an immediate need of each client of the plurality of clients based on weighted attributes; assembling a prioritization list of clients based on the determined immediate needs of each client; and/or delivering unicast messages to the clients in accordance with an order specified by the prioritization list. In some scenarios, the weighted attributes comprise the proximity of a client to an MBMS transport bearer service area, a group affiliation status of a client, and/or a group state.

The computing device may also perform third operations to modify the MBMS transport bearer or MBMS transport bearer's service area. In this case, the computing device performs a second iteration of the second operations to inform the plurality of clients of the MBMS transport bearer's modification or MBMS transport bearer's service area modification.

In some scenarios, first ones of the unicast messages are delivered to first clients of the plurality of clients using a first amount of bandwidth during a first period of time and second ones of the unicast messages are delivered to second clients of the plurality of clients using a second amount of bandwidth during a second period of time following the first period of time. The second amount of bandwidth may be less than the first amount of bandwidth. Additionally or alternatively, the second period of time may be longer or shorter than the first period of time. Notably, the present solution is not limited to scenarios in which first and second set of client are notified. There can be any number of batches of unicast messages, not just two batches as described here.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the present solution. Several aspects of the present solution are described below with reference to example applications for illustration. It should be understood that numerous specific details, relationships, and methods are set forth to provide a full understanding of the present solution. However, the present solution can be practiced without one or more of the specific details or with other methods. In other instances, well-known structures or operation are not shown in detail to avoid obscuring the present solution. The present solution is not limited by the illustrated ordering of acts or events, as some acts may occur in different orders and/or concurrently with other acts or events. Furthermore, not all illustrated acts or events are required to implement a methodology in accordance with the present solution.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

The present document generally concerns systems and methods for using MBMS transport bearers in a network. The methods comprise: performing first operations by a computing device to setup an MBMS transport bearer over which media (e.g., voice) is able to be communicated to a plurality of clients via multicast transmissions; and performing second operations by the computing device to inform the plurality of clients of the MBMS transport bearer's establishment. The second operations include, but are not limited to: building a list of clients to receive information indicating that the MBMS transport bearer has been setup; determining an immediate need of each client of the plurality of clients based on weighted attributes (e.g., priority group affiliating, and/or group status); assembling a prioritization list of clients based on the determined immediate needs of each client; and delivering unicast messages to the clients in accordance with an order specified by the prioritization list.

Figure 1:
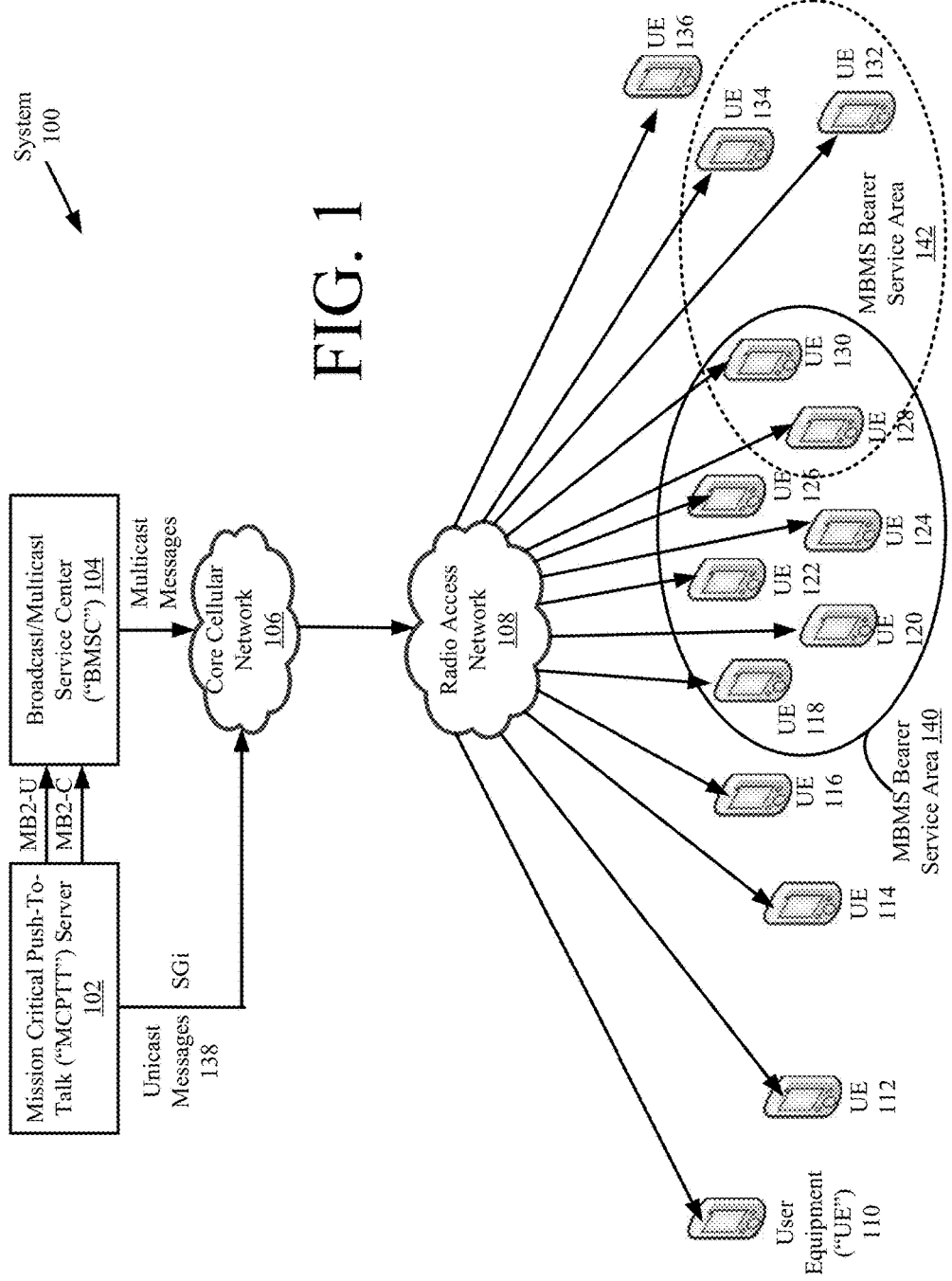
FIG. 1 is a schematic illustration of an exemplary system that is useful for understanding the present invention.

Referring now to FIG. 1, there is provided a schematic illustration of an exemplary system 100. System 100 is generally configured to provide Mission Critical Push-To-Talk ("MCPTT") services, Mission Critical ("MC") video services and/or MC data services to end users or clients. In this regard, system 100 comprises an application server 102 and a BMSC 104 for facilitating multicast and unicast communications with the end users or clients.

The present solution is described herein in relation to MCPTT services. As such, the application server 102 is also referred to herein as an MCPTT server since it performs at least MCPTT services. The present solution is not limited in this regard. The application server 102 can additionally or alternatively comprise a server configured to perform mission critical video services and/or mission critical data services. In these cases, the application server 102 can be additionally or alternatively be called an MCvideo server (i.e., an application server configured to provide at least MC video services) and/or an MCdata server (i.e., an application server configured to provide at least MC data services).

MCPTT server 102 implements an MCPTT application function that connects into a core cellular network 106 (e.g., a Long Term Evolution ("LTE") system). The MCPTT server 102 is similar to a content provider that connects to the BMSC 104. The MCPTT server 102 communicates with the BMSC 104 to control the set-up and release of MBMS transport bearers and the scheduling of MBMS transmissions for Push-To-Talk ("PTT") purposes (e.g., to broadcast group calls to end users or clients that are in the same general area). Techniques for setting up and releasing MBMS transport bearers are well known in the art. Any known or to be known technique for setting up and releasing MBMS transport bearers can be used herein without limitation. PTT is well known in the art, and therefore will not be described in detail herein. Once an MBMS transport bearer has been setup, MBMS transmissions are sent from the BMSC 104 to the end user nodes via the core cellular network 106 and a radio access network 108 using multicast messages 144 (which may include voice communications of a PTT talkgroup).

In all cases, the MBMS transport bearers are dynamically setup and modified by MCPTT server 102 based on pre-defined criteria. For example, in some scenarios, an MBMS transport bearer is established when the MCPTT server 102 determines that a certain number of end user devices (e.g., User Equipment ("UE") 110-136) are located in a given geographical area, and therefore multicast messaging should be employed for various purposes (e.g., the minimization of traffic congestion, the minimization of hardware resource intensity, and an increase in the resource efficiency) as opposed to unicast messaging. The present invention is not limited to the particulars of this example. Any known or to be known criteria can be used herein without limitation. For example, any criteria can be used that provides a means for determining whether multicast messaging should be employed as opposed to unicast messaging.

Once an MBMS transport bearer is setup or modified, the UE 110-136 needs to be provided knowledge of the MBMS transport bearer's establishment/modification before the same can be used for the broadcast of PTT voice communications (e.g., talkgroup voice communications) in an MBMS bearer service area 140 (or additional service area 142). Such knowledge is provided from the MCPTT server 102 to the UE 110-136 via unicast messages 138 that are sent through the core cellular network 106 and the radio access network 108. Notably, the BMSC 104 is not used for the communication of the unicast messages 138.

In conventional systems, the MCPTT server 102 sends unicast messages to all of the UE 110-136 that might be interested in the MBMS transport bearer's establishment or modification. Depending on the number of affected UEs, this may result in a provisioning storm (i.e., temporary congestion). Accordingly, various solutions have been derived to overcome the provisioning storm problem of conventional MBMS based systems.

One conventional solution involves setting up static MBMS transport bearers during system deployment (i.e., before system is even up and running). For example, a first static MBMS transport bearer is setup for a particular city and a second static MBMS transport bearer is setup for a half of a county. All of the UEs are provided knowledge of the first and second static MBMS transport bearers prior to being deployed in the system. Despite the advantages of this conventional solution, it suffers from certain drawbacks. In this system, the multicast areas cannot be setup intelligently to be efficient as evident from the following Examples 1-3.

EXAMPLE 1

In the conventional system, a first static MBMS transport bearer is setup to cover city A. A second static MBMS transport bearer is setup to cover city B. All of the UEs are provided knowledge of the first and second static MBMS transport bearers prior to being deployed in the system. During operation, a massive incident occurs on the boundary of city A and city B. As such, multicast traffic must be sent on the first and second static MBMS transport bearers in order to obtain the overlap to cover the entire footprint of the incident area. In this case, there is an undesirable level of hardware resource intensity and resource inefficiency.

EXAMPLE 2

In the conventional system, a static MBMS transport bearer is setup to cover city B. No MBMS transport bearer is setup to cover city C. All of the UEs are provided knowledge of the static MBMS transport bearer setup for city B prior to being deployed in the system. In this case, end users in the city B footprint are able to be serviced via multicast messaging using the static MBMS transport bearer. However, the end users in the city C footprint are serviced using unicast messaging. In this case, there is an undesirable level of hardware resource intensity and resource inefficiency, as well as the possibility of traffic congestion in the city C footprint.

EXAMPLE 3

In the conventional system, a plane crashes in a geographic area where no MBMS transport bearers have been setup. As such, only unicast messaging can be employed in this scenario. One can appreciate that if there are a relatively large number of end user devices then traffic congestion can occur.

Another conventional solution involves announcing MBMS transport bearer creation and updates to all clients at the same time via unicast messaging. The drawback of this solution is that a provisioning storm occurs which increases traffic congestion.

Yet another conventional solution involves using LTE network congestion detection and management functionality for offered traffic. However, the consequence of relying on this functionality is that some of the unicast messages can be dropped when the offered load to the LTE network is too great. The drawback is that when multicast is trying to be implemented to alleviate congestion issues occur which prevent such implementation.

Figure 2:
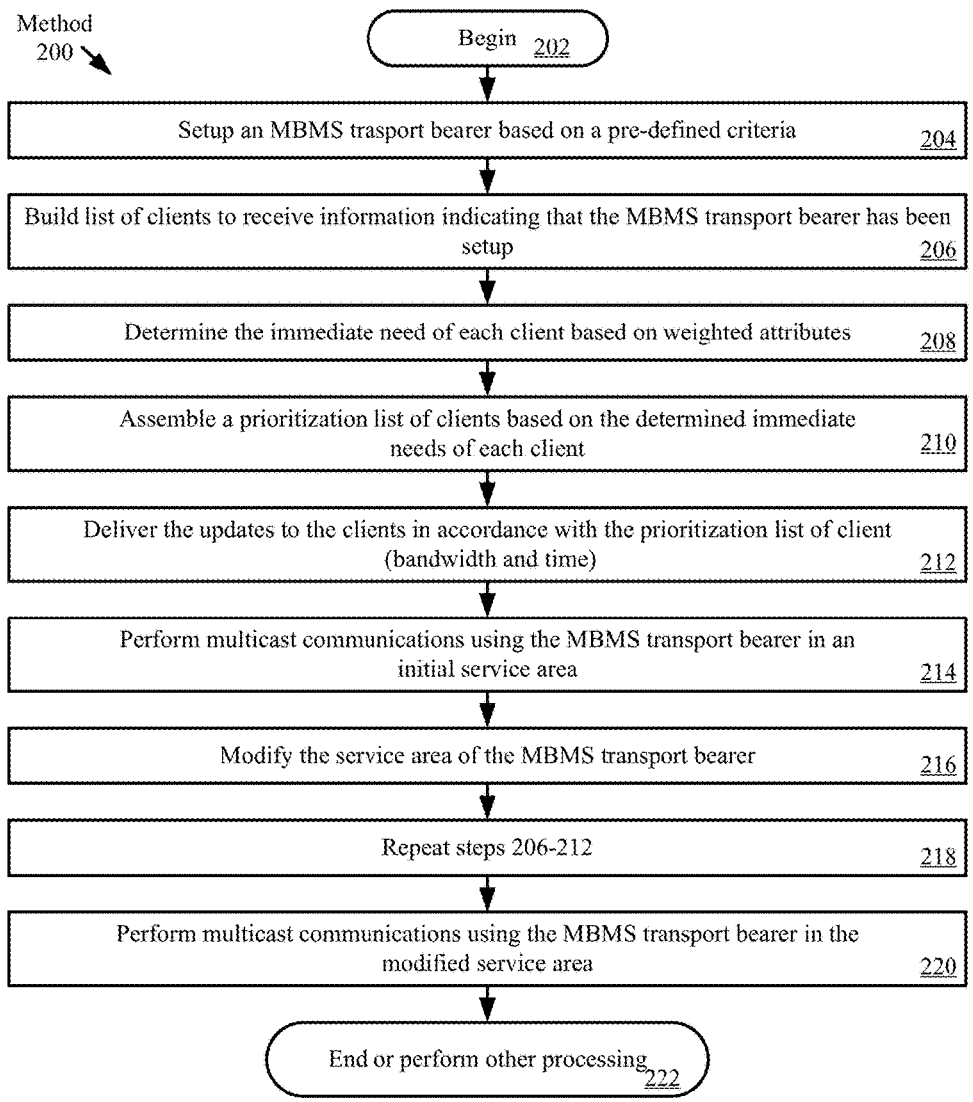
FIG. 2 is a flow diagram of an exemplary method implementing the present solution.

In view of the forgoing, the present solution provides a technique to overcome the drawbacks of the conventional solutions for providing knowledge to UEs of MBMS transport bearer establishment and/or modifications. The present solution involves sending the unicast messages 138 to the UEs 110-136 in an intelligent manner so as to prevent provisioning storms. FIG. 2 provides a flow diagram of an exemplary method 200 implementing the present solution.

Referring now to FIG. 2, method 200 begins with step 202 and continues with step 204 in which an MCPTT server (e.g., MCPTT server 102 of FIG. 1) performs operations to setup an MBMS transport bearer for handling talkgroup voice communications (e.g., a group patrol talkgroup voice communications) based on a pre-defined criteria. For example, the MBMS transport bearer is dynamically setup by the MCPTT server when a threshold number of UEs (e.g., UEs 110-136 of FIG. 1) are located in a relatively small geographic area. The present invention is not limited to the particulars of this example. The criteria for setting up an MBMS transport bearer can include any criteria indicating that multicast communications are preferred over unicast communications. Techniques for setting up MBMS transport bearers are known in the art. Any known or to be known technique for setting up MBMS transport bearers can be used herein without limitation.

After completing step 204, steps 206-212 are performed to inform members of the talkgroup that the MBMS transport bearer has been established. These steps involve: building a list of clients who are to receive information indicating that the MBMS transport bearer has been setup (e.g., 1000 users who can potentially take part in the talkgroup communications); determining the immediate needs of each client based on weighted attributes or criteria; assembling a prioritized list of clients based on the determined immediate needs of each client; and delivering the updates to the clients via unicast messages (e.g., unicast messages 138 of FIG. 1) in accordance with the prioritized list (bandwidth and time). The weighting attributes or criteria used in step 208 is described below in detail.

In some cases, the unicast messages (e.g., unicast messages 138 of FIG. 1) are first transmitted to UEs associated with those clients having a first priority classification using a relatively large amount of bandwidth during a first period of time. Unicast messages are then sent to UEs associated with those clients having a second priority classification using a smaller amount of bandwidth during a second period of time longer than the first period of time. Finally, unicast messages are sent to UEs associated with those clients having a third priority classification using an even smaller amount of bandwidth during a third period of time longer than the first and second periods of time. The present invention is not limited to the particulars of this example.

Upon completing step 212, step 214 is performed where multicast communications are performed using the MBMS transport bearer in an initial service area (e.g., MBMS bearer service area 140 of FIG. 1). At some later time, the service area of the MBMS transport bearer is modified, as shown by step 216. In this case, steps 206-212 are repeated to inform members of the talkgroup that the service area of the MBMS transport bearer has been modified, as shown by step 218. Upon completing step 218, step 220 is performed where multicast communications (e.g., including multicast messages 144 of FIG. 1) are performed using the MBMS transport bearer in the initial service area (e.g., MBMS bearer service area 140 of FIG. 1) and the modified service area (e.g., MBMS bearer service area 142 of FIG. 1). Subsequently, step 222 is performed where method 200 ends or other processing is performed.

In some scenarios, the weighting criteria used in step 208 includes, but is not limited to, proximity, group affiliation status and/or group state. One or more of the listed weighting criteria can be used in step 208 to determine the immediate need of each client. Also, any combination of the listed weighting criteria can be used in step 208.

With regard to the proximity weighting criteria, the clients are prioritized based on impact of updated bearer footprint. For example, a client may be: (A) immediately impacted by an updated bearer footprint; (B) may roam into an expanded service area of an MBMS transport bearer; (C) may roam into an updated bearer footprint; (D) will not likely be impacted soon by an updated bearer footprint; and (E) will likely never be impacted by an updated bearer footprint. The schematic illustration provided in FIG. 3 is useful for understanding the proximity weighting criteria.

Figure 3:
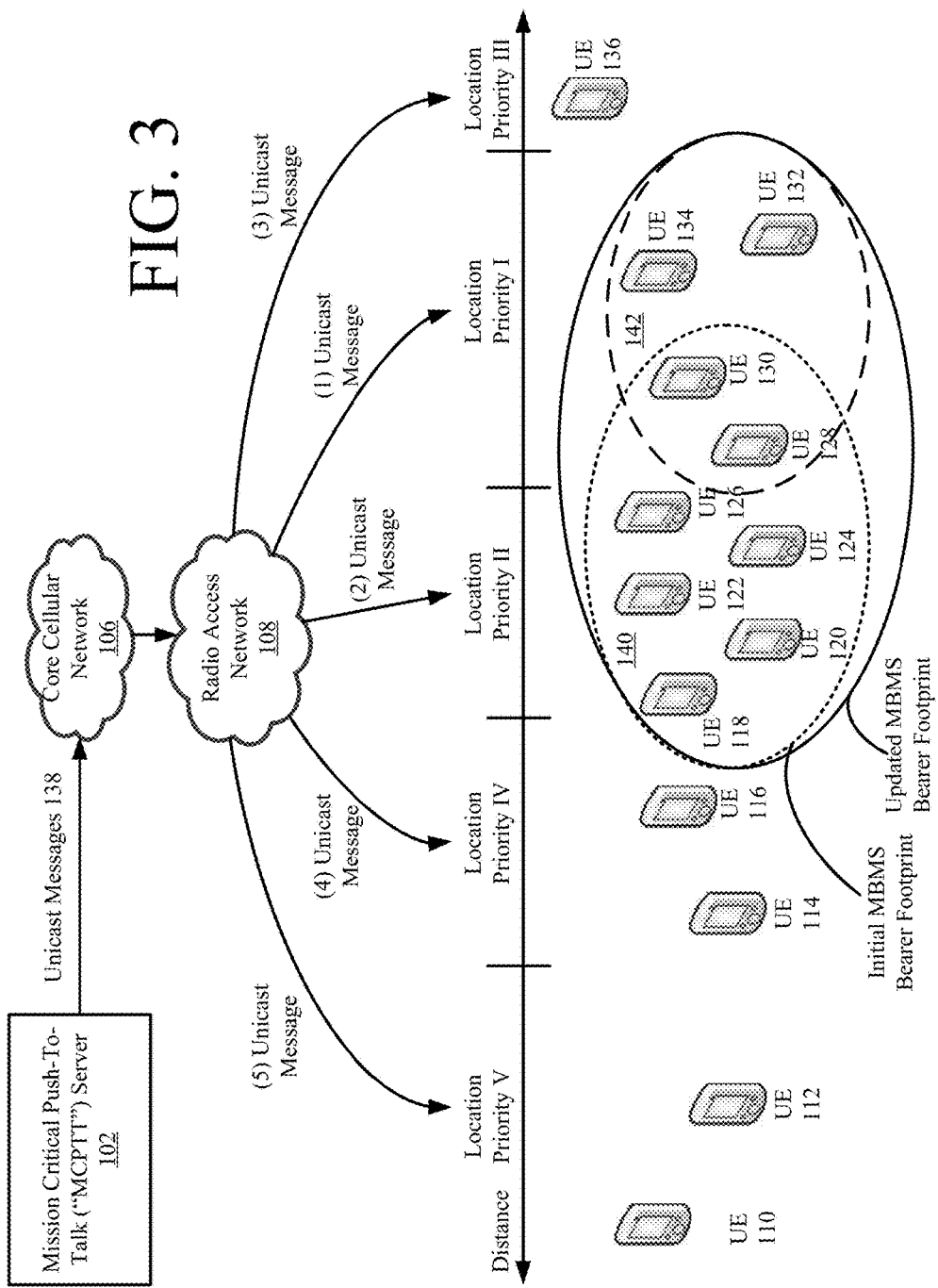
FIGS. 3-4 provide schematic illustrations that are useful in understanding weighting criteria for determining immediate needs of clients.

As shown in FIG. 3, the MCPTT server 102 updates the MBMS bearer footprint by expanding the initial service area 140 to include new service area 142. At time zero, all UE 110-136 knows about the initial service area 140 of an MBMS transport bearer. The MCPTT server 102 decides that it wants to add the new service area 142, and now the MCPTT server 102 has to send an update to the UE 110-136 for the new service area 142. The MCPTT server 102 uses a proximity weighting criteria to determine the order in which UE 110-136 should receive the unicast message indicating the updated MBMS bearer footprint.

Based on a result of the proximity weighting criteria, UE 128-134 are assigned location priority I because these devices can be actively serviced right now by the updated MBMS bearer footprint. The UE 118-126 are assigned a location priority II because they (a) are already aware of the initial service area 140, (b) are already receiving multicast voice using the MBMS transport bearer, (c) are able to continue to use the MBMS transport bearer despite the MBMS bearer footprint update, and (d) might roam into the new service area 142. UE 136 is assigned location priority III because they are closer to the new service area 142 than UE 110-116, and therefore might roam into the new service area 142 that they did not know existed prior to UE 110-116. UE 114, 116 are assigned location priority IV because if they can roam into the updated MBMS bearer footprint they will enter into the initial MBMS bearer footprint for which they already have knowledge. UE 110, 112 are assigned location priority V because they are likely to be the last UE to roam into the new service area 142 (since they are the furthest away therefrom).

After determining the location priorities of the UE, the MCPTT server 102 can communicate unicast messages to the UE in accordance with their location priorities and/or other weighting criteria (as discussed herein). If the location priorities are the only weighting criteria considered by the MCPTT server 102, then the unicast message is first sent to UE 128-134 followed by UE 118-126, and so on.

With regard to the group affiliation status weighting criteria, the clients are prioritized based on (a) users' affiliation to groups in use by the MBMS transport bearer and/or (b) users' affiliation to groups which may qualify for MBMS transmission in the short term. Affiliation, as used herein, means the state of being affiliated or connected with a group for receiving communications sent to/from members thereof via an MBMS transport bearer. For example, there are N users (e.g., 1000 users) who are allowed to participate and use the group patrol talkgroup for voice communications. These users also have a plurality of other talkgroups (e.g., a fire talkgroup) that they can use for voice communications. Only the users that have told the MCPTT server 102 that they are currently interested in voice communication for the group patrol talkgroup are affiliated with the group patrol talkgroup. These users are not affiliated with the other talkgroups since they have not told the MCPTT server 102 that they are currently interested in voice communication for these other talkgroups. The present invention is not limited to the particulars of this example.

In some scenarios, only those users that are affiliated with a particular talkgroup are informed about MBMS transport bearer updates. In other scenarios, the MCPTT server 102 would like to tell all users (who are able to use the group patrol talkgroup for voice communications) about the MBMS transport bearer setup or modification. Such MBMS transport bearer updates to non-affiliated users are desirable because if the non-affiliated users are in the MBMS bearer footprint and later decide that they are interested in voice communications of the group patrol talkgroup then the UEs do not have to perform the affiliation/update signaling at that time to obtain MBMS transport bearer information from the MCPTT server 102. Therefore during operation, the MCPTT server 102 first informs affiliated users about MBMS transport bearer updates, and then informs the non-affiliated users which may qualify for MBMS transmission in the short term thereof. These non-affiliated users can be selected or prioritized in accordance with the above described proximity weighting criteria.

With regard to the group state weighting criteria, the clients are prioritized based on group priorities. For example, if the CIA and FBI are coming into a service area, then users associated with these organizations are given higher priority than those users who are not associated with these organizations. As such, the CIA/FBI-associated users are informed about MBMS transport bearer updates prior to non-CIA/FBI-associated users. Clients may alternatively or additionally be prioritized based on group states. For example, if a group enters into an emergency state, then communications for this group preempt communications of other groups (such as the CIA/FBI). The present invention is not limited to the particulars of these examples.

Figure 4:
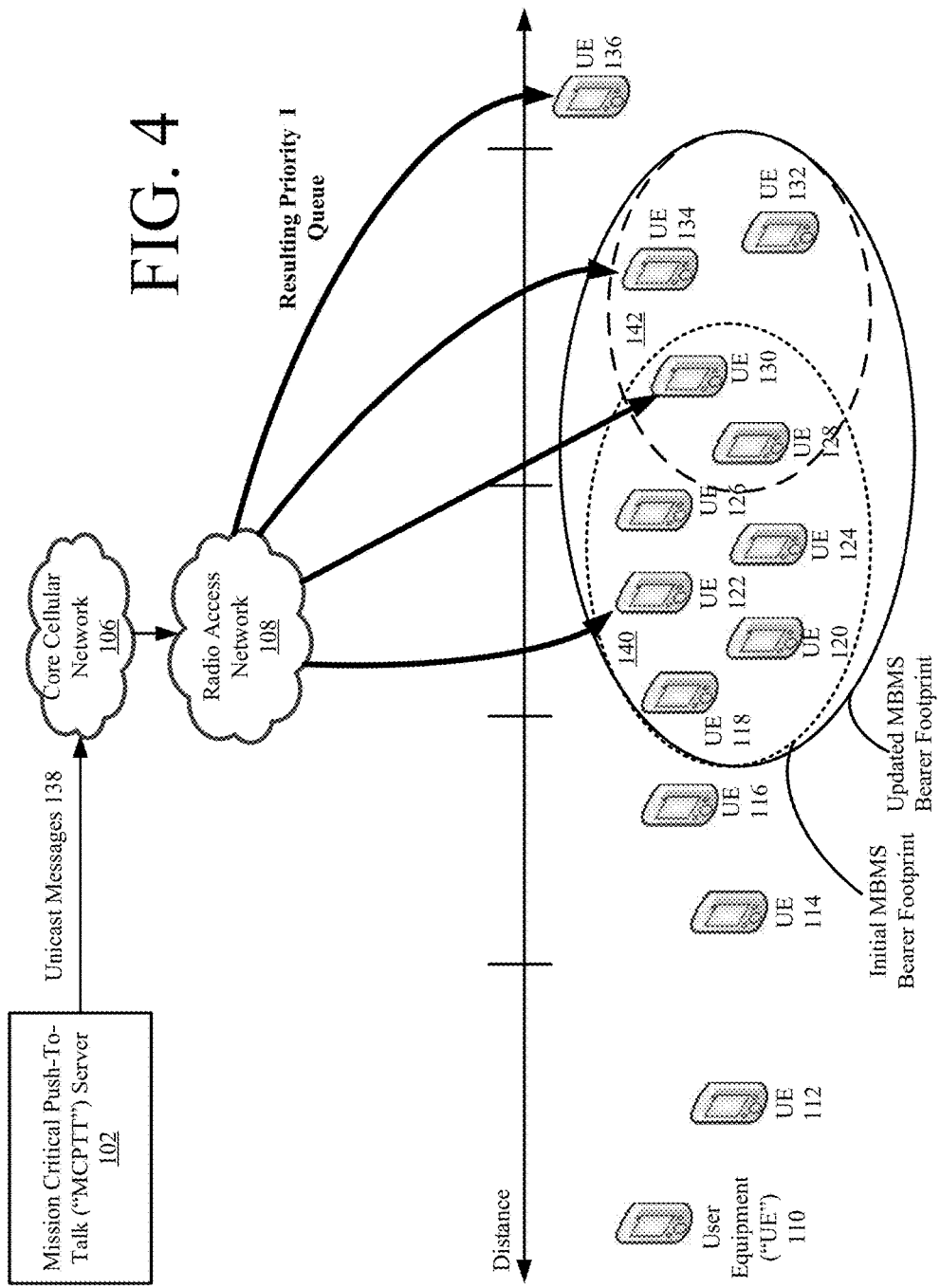

Referring now to FIG. 4, there is provided a schematic illustration that is useful for understanding the group affiliation and group state weighing criteria. As shown in FIG. 4, UE 122, 130, 134, 136 are assigned to the resulting priority I queue based on the proximity weighting criteria, the group affiliation weighting criteria, and/or the group state weighting criteria because these four UEs are part of a talkgroup that are in an emergency state, for example. Accordingly, unicast messages are first sent from the MCPTT server 102 to UE 122, 130, 134, 136. The present invention is not limited by the particulars of this example.

Figure 5:
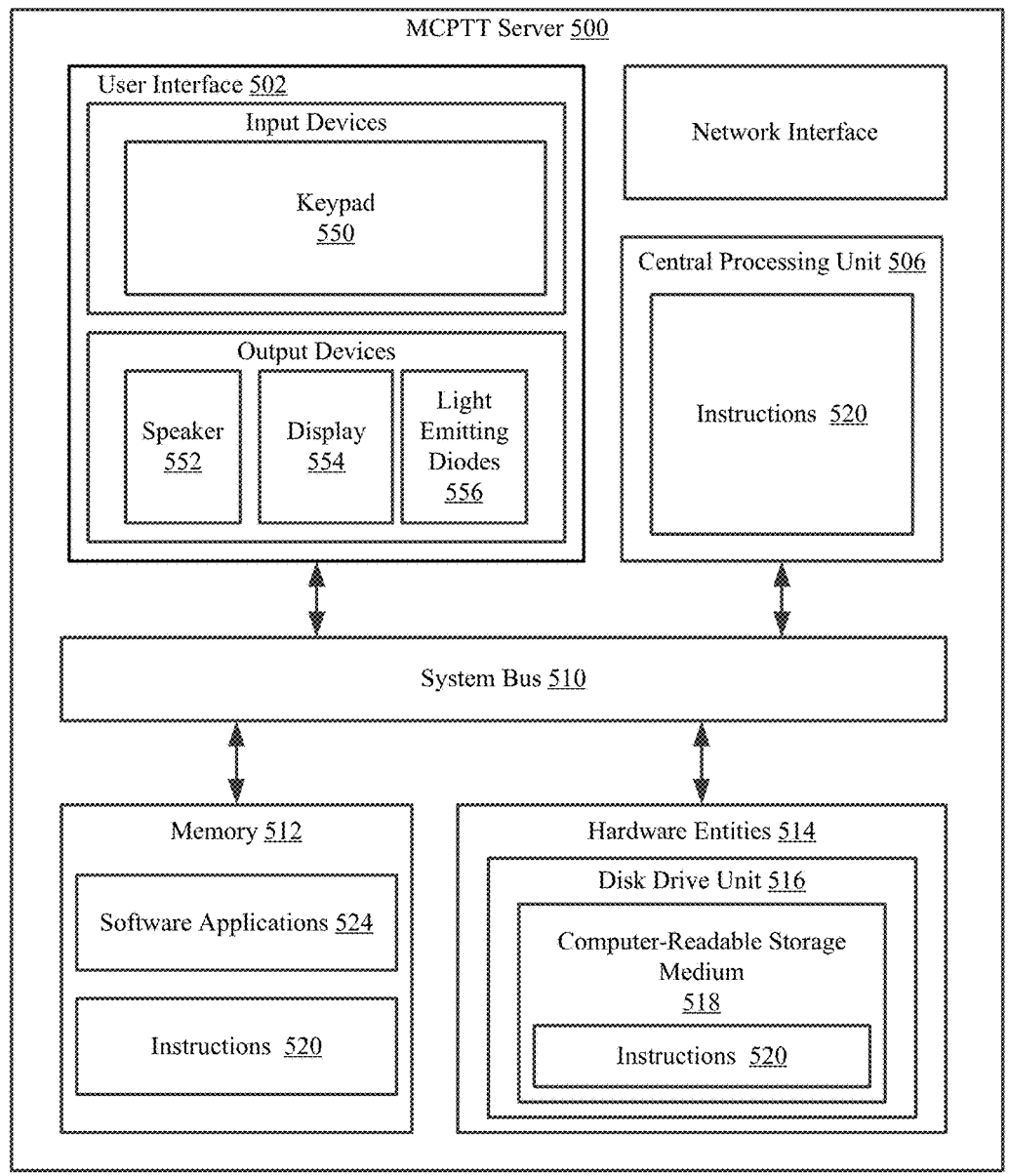
FIG. 5 is a block diagram of an exemplary architecture for a mission critical push-to-talk server.

FIG. 5 is a block diagram of an exemplary architecture for an MCPTT server 500. MCPTT server 102 of FIG. 1 is the same as or substantially similar to MCPTT server 500. As such, the discussion of MCPTT server 500 is sufficient for understanding MCPTT server 102.

Notably, the MCPTT server 500 may include more or less components than those shown in FIG. 5. However, the components shown are sufficient to disclose an illustrative embodiment implementing the present invention. The hardware architecture of FIG. 5 represents one embodiment of a representative MCPTT server configured to facilitate the dynamic assignment and modification of MBMS transport bearers. As such, the MCPTT server 500 of FIG. 5 implements at least a portion of a method described herein for sending the unicast messages to the UEs in an intelligent manner so as to prevent provisioning storms.

Some or all the components of the MCPTT server 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the MCPTT server 500 comprises a user interface 502, a Central Processing Unit ("CPU") 506, a system bus 510, a memory 512 connected to and accessible by other portions of MCPTT server 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the MCPTT server 500. Also, algorithms and weighting criteria may be presented to the user of the MCPTT server 500 via the display 554. The user may specify and/or change these algorithms and weighting criteria using the input devices (e.g., a keypad 550). The algorithms and weighting criteria are used by the MCPTT server 500 to determine the immediate needs of each client based on weighted attributes (as discussed above in relation to step 208 of FIG. 2).

At least some of the hardware entities 514 perform actions involving access to and use of memory 512, which can be a Random Access Memory ("RAM"), a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the MCPTT server 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the MCPTT server 500 and that cause the MCPTT server 500 to perform any one or more of the methodologies of the present disclosure.

In some scenarios, the hardware entities 514 include an electronic circuit (e.g., a processor) programmed for facilitating (a) the setting up of MBMS transport bearers, (b) the modification of MBMS transport bearers, MBMS bearer service areas and/or MBMS bearer footprints, and/or (c) the generation and transmission of unicast messages to UEs for purposes of informing them about MBMS transport bearer updates (including service area and footprint modifications). In this regard, it should be understood that the electronic circuit can access and run software applications 524 installed on the MCPTT server 500. The software application 524 is generally operative to facilitate: the setting up of MBMS transport bearers; the modification of MBMS transport bearers, MBMS bearer service areas and/or MBMS bearer footprints; and/or the generation and transmission of unicast messages to UEs for purposes of informing them about MBMS transport bearer updates (including service area and footprint modifications). Other functions of the software application 524 should be apparent from the above discussion.

In view of the forgoing, the present invention provides a novel technique for the provision of new and updated MBMS bearer announcements to clients based on their current and anticipated needs for the information. This is a proactive approach compared to the reactive solutions available today. The present solution differentiates from conventional MCPTT solutions by: providing the carrier a more reliable and robust ability to dynamically assign or modify MBMS bearer service areas; and allowing a carrier to better utilize LTE resources by allocating MBMS transport bearers as they are required (as opposed to allocating MBMS transport bearers on a semi-permanent basis in order to avoid a potential provisioning storm).

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for using Multimedia Broadcast Multicast Services ("MBMS") transport bearers in a network, comprising:
    performing first operations by a computing device to setup an MBMS transport bearer over which media is able to be communicated to a plurality of clients via multicast transmissions; and
    performing second operations by the computing device to provide information to the plurality of clients indicating the MBMS transport bearer's establishment, the second operations comprising
        building a list of clients to receive information indicating the MBMS transport bearer's establishment,
        determining an immediate need of each client of the clients in the list based on weighted attributes,
        assembling a prioritization list of clients based on the determined immediate needs of each client, and
        using unicast communication to deliver unicast messages to the clients in accordance with an order specified by the prioritization list.

2. The method according to claim 1, wherein the computing device is a Mission Critical Push-To-Talk ("MCPTT") server, a Mission Critical ("MC") video server or an MC data server.

3. The method according to claim 1, wherein the weighted attributes comprise at least one of a proximity of a client to an MBMS transport bearer service area, a group affiliation status of a client, and a group state.

4. The method according to claim 3, wherein the MBMS transport bearer service area comprises a first MBMS transport bearer service area, and the first operations involve modifying the first MBMS transport bearer service area, to create a second MBMS transport bearer service area which is different in geographic scope as compared to the first MBMS transport bearer service area.

5. The method according to claim 4, further comprising applying the group affiliation weighted attribute to selectively arrange said prioritization list, wherein a priority for informing each of the clients is based on an indication received from each of the clients specifying whether a user has a current interest in participating within a specified talkgroup.

6. The method according to claim 4, further comprising applying the group state weighted attribute to selectively arrange said prioritization list, wherein a priority for informing each of the clients is based on client membership in a particular client organizational grouping.

7. The method according to claim 4, wherein the prioritization list is based on an operational state of a particular client organizational grouping.

8. The method according to claim 1, wherein the weighted attributes comprise a combination of at least two of a proximity of a client to an MBMS transport bearer service area, a group affiliation status of a client, and a group state.

9. The method according to claim 1, further comprising:
performing third operations by the computing device to modify the MBMS transport bearer or MBMS transport bearer's service area; and
performing a second iteration of the second operations to inform the plurality of clients of the MBMS transport bearer's modification or MBMS transport bearer's service area modification.

10. The method according to claim 1, wherein first ones of the unicast messages are delivered to first clients of the plurality of clients using a first amount of bandwidth during a first period of time and second ones of the unicast messages are delivered to second clients of the plurality of clients using a second amount of bandwidth during a second period of time following the first period of time, the second amount of bandwidth less than the first amount of bandwidth.

11. The method according to claim 10, wherein the second period of time is longer than the first period of time.

12. The method according to claim 1, wherein the MBMS transport bearer is dynamically setup when the computing device determines that a threshold number of clients are located in a given geographic area.

13. A method for using Multimedia Broadcast Multicast Services ("MBMS") transport bearers in a network, comprising:
performing first operations by a computing device to setup an MBMS transport bearer over which media is able to be communicated to a plurality of clients via multicast transmissions;
performing second operations by the computing device to inform the plurality of clients of the MBMS transport bearer's establishment, the second operations comprising
determining an immediate need of each client of the plurality of clients based on weighted attributes,
assembling a prioritization list of clients based on the determined immediate needs of each client, and
delivering unicast messages to the clients in accordance with an order specified by the prioritization list;
performing third operations by the computing device to modify the MBMS transport bearer or MBMS transport bearer's service area;
performing a second iteration of the second operations to inform the plurality of clients of the MBMS transport bearer's modification or MBMS transport bearer's service area modification; and
building a list of clients to receive information indicating the MBMS transport bearer's modification or MBMS transport bearer's service area modification, prior to determining the immediate need of each client of the plurality of clients during the second iteration of the second operations.

14. A system, comprising:
a computing device
performing first operations to setup an MBMS transport bearer over which media is able to be communicated to a plurality of clients via multicast transmissions, and
performing second operations to provide information to the plurality of clients indicating the MBMS transport bearer's establishment, the second operations comprising
building a list of clients to receive information indicating the MBMS transport bearer's establishment,
determining an immediate need of each client of the clients in the list based on weighted attributes,
assembling a prioritization list of clients based on the determined immediate needs of each client, and
using unicast communication to deliver unicast messages to the clients in accordance with an order specified by the prioritization list.

15. The system according to claim 14, wherein the computing device is a Mission Critical Push-To-Talk ("MCPTT") server, a Mission Critical ("MC") video server or an MC data server.

16. The system according to claim 14, wherein the weighted attributes comprise at least one of a proximity of a client to an MBMS transport bearer service area, a group affiliation status of a client, and a group state.

17. The system according to claim 14, wherein the weighted attributes comprise a combination of at least two of a proximity of a client to an MBMS transport bearer service area, a group affiliation status of a client, and a group state.

18. The system according to claim 14, wherein the computing device further:
performs third operations to modify the MBMS transport bearer or MBMS transport bearer's service area; and
performs a second iteration of the second operations to inform the plurality of clients of the MBMS transport bearer's modification or MBMS transport bearer's service area modification.

19. The system according to claim 14, wherein first ones of the unicast messages are delivered to first clients of the plurality of clients using a first amount of bandwidth during a first period of time and second ones of the unicast messages are delivered to second clients of the plurality of clients using a second amount of bandwidth during a second period of time following the first period of time, the second amount of bandwidth less than the first amount of bandwidth.

20. The system according to claim 19, wherein the second period of time is longer than the first period of time.

21. The system according to claim 14, wherein the MBMS transport bearer is dynamically setup when the computing device determines that a threshold number of clients are located in a given geographic area.

22. A system, comprising:
a computing device
performing first operations to setup an MBMS transport bearer over which media is able to be communicated to a plurality of clients via multicast transmissions, and
performing second operations to inform the plurality of clients of the MBMS transport bearer's establishment, the second operations comprising
determining an immediate need of each client of the plurality of clients based on weighted attributes,
assembling a prioritization list of clients based on the determined immediate needs of each client, and
delivering unicast messages to the clients in accordance with an order specified by the prioritization list;

wherein the computing device further:
performs third operations to modify the MBMS transport bearer or MBMS transport bearer's service area; and
performs a second iteration of the second operations to inform the plurality of clients of the MBMS transport bearer's modification or MBMS transport bearer's service area modification;
wherein a list of clients to receive information indicating that the MBMS transport bearer's modification or MBMS transport bearer's service area modification is built prior to when the immediate need of each client is determined during the second iteration of the second operations.

23. A method for using Multimedia Broadcast Multicast Services ("MBMS") transport bearers in a network, comprising:
performing first operations by a computing device to setup an MBMS transport bearer over which media is able to be communicated to a plurality of clients via multicast transmissions; and
performing second operations by the computing device to inform the plurality of clients of the MBMS transport bearer's establishment, the second operations comprising:
determining an immediate need of each client of the plurality of clients based on weighted attributes, where
the weighted attributes comprise at least one of a proximity of a client to an MBMS transport bearer service area, a group affiliation status of a client, and a group state, and
the MBMS transport bearer service area comprises a first MBMS transport bearer service area that are modified during the first operations to create a second MBMS transport bearer service area which is different in geographic scope as compared to the first MBMS transport bearer service area;
assembling a prioritization list of clients based on the determined immediate needs of each client; and
delivering unicast messages to the clients in accordance with an order specified by the prioritization list; and
applying the proximity weighted attribute to selectively arrange said prioritization list wherein a priority for informing each of the clients is based on an anticipated impact that the second MBMS transport bearer service area will have upon an ability of the clients to participate in the multicast transmissions.

24. The method according to claim 23, further comprising including within the prioritization list one or more of the clients located within the second MBMS transport bearer service area, and one or more of the clients located outside the second MBMS transport bearer service area.

25. The method according to claim 23, further comprising assigning the clients that are outside the second MBMS transport bearer service area a higher priority on the prioritization list if they are proximal to the second MBMS transport bearer service area, and lower priority if they are more distant from the second MBMS transport bearer service area.

26. The method according to claim 23, further comprising assigning a first set of the clients that are located within the second MBMS transport bearer service area a lower priority on the prioritization list as compared to a second set of the clients in the second MBMS transport bearer service area, if the first set of clients were previously located within the first MBMS transport bearer service area.

27. A method for using Multimedia Broadcast Multicast Services ("MBMS") transport bearers in a network, comprising:
performing first operations by a computing device to setup an MBMS transport bearer over which media is able to be communicated to a plurality of clients via multicast transmissions; and
performing second operations by the computing device to inform the plurality of clients of the MBMS transport bearer's establishment, the second operations comprising:
determining an immediate need of each client of the plurality of clients based on weighted attributes, where
the weighted attributes comprise at least one of a proximity of a client to an MBMS transport bearer service area, a group affiliation status of a client, and a group state, and
the MBMS transport bearer service area comprises a first MBMS transport bearer service area that are modified during the first operations to create a second MBMS transport bearer service area which is different in geographic scope as compared to the first MBMS transport bearer service area;
assembling a prioritization list of clients based on the determined immediate needs of each client;
delivering unicast messages to the clients in accordance with an order specified by the prioritization list;
applying the group affiliation weighted attribute to selectively arrange said prioritization list, wherein a priority for informing each of the clients is based on an indication received from each of the clients specifying whether a user has a current interest in participating within a specified talkgroup; and
including within the prioritization list one or more affiliated clients who have specified a current interest in participating in voice communications for the specified talkgroup, and one or more of the clients who have specified an absence of current interest in participating in voice communications for the specified talkgroup.

28. The method according to claim 27, further comprising assigning the affiliated clients a higher priority on the prioritization list as compared to the clients that specified an absence of current interest in participating in voice communications for the specified talkgroup.

29. A method for using Multimedia Broadcast Multicast Services ("MBMS") transport bearers in a network, comprising:
performing first operations by a computing device to setup or modify an MBMS transport bearer over which media is able to be communicated to a plurality of clients via multicast transmissions; and
performing second operations by the computing device to provide information to the plurality of clients indicting the MBMS transport bearer's establishment or modification, the second operations comprising
building a list of clients to receive information indicating the MBMS transport bearer's establishment,
determining an immediate need of each of the clients in the list based on a plurality of weighted attributes selected from the group consisting of a proximity of each said client to an MBMS transport bearer service area, a group affiliation status of each said client, and a group state of each said client;

assembling a prioritization list comprised of the plurality of clients, in which the clients are prioritized based on an evaluation of the plurality of weighted attributes, and using unicast communication to deliver unicast messages to the clients concerning the establishment or modification of the MBMS transport bearer in accordance with an order specified by the prioritization list.

* * * * *